(12) United States Patent
Kim et al.

(10) Patent No.: US 9,165,261 B2
(45) Date of Patent: Oct. 20, 2015

(54) APPARATUS AND METHOD FOR PERFORMING ACCOUNTING IN WIRELESS COMMUNICATION SYSTEM

(75) Inventors: Han-Seok Kim, Seoul (KR); Ki-Back Kim, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 861 days.

(21) Appl. No.: 12/321,491

(22) Filed: Jan. 22, 2009

(65) Prior Publication Data

US 2009/0187498 A1 Jul. 23, 2009

(30) Foreign Application Priority Data

Jan. 22, 2008 (KR) ........................ 10-2008-0006464

(51) Int. Cl.
*H04L 1/00* (2006.01)
*G07B 17/00* (2006.01)
*G06Q 10/00* (2012.01)
*G06Q 40/00* (2012.01)

(52) U.S. Cl.
CPC ................ *G06Q 10/00* (2013.01); *G06Q 40/12* (2013.01)

(58) Field of Classification Search
USPC .......................................................... 705/30
See application file for complete search history.

(56) References Cited

U.S. PATENT DOCUMENTS

| | | | |
|---|---|---|---|
| 6,226,373 B1* | 5/2001 | Zhu et al. ................. | 379/207.02 |
| 6,446,200 B1* | 9/2002 | Ball et al. ........................ | 713/1 |
| 6,728,365 B1* | 4/2004 | Li et al. ........................... | 379/329 |
| 6,801,940 B1* | 10/2004 | Moran et al. ................... | 709/224 |
| 6,882,632 B1* | 4/2005 | Koo et al. ....................... | 370/335 |
| 7,167,860 B1* | 1/2007 | Black et al. ...................... | 705/35 |
| 7,243,143 B1* | 7/2007 | Bullard ........................ | 709/223 |
| 7,400,634 B2* | 7/2008 | Higashitaniguchi et al. ......................... | 370/395.53 |
| 7,478,156 B1* | 1/2009 | Pereira .......................... | 709/224 |
| 7,508,780 B2* | 3/2009 | Zhang et al. ................... | 370/311 |
| 7,681,203 B2* | 3/2010 | Mandato et al. .............. | 719/316 |
| 7,796,570 B1* | 9/2010 | Farley et al. ................... | 370/338 |
| 7,855,982 B2* | 12/2010 | Ramankutty et al. ......... | 370/259 |
| 7,899,024 B2* | 3/2011 | Chou ........................... | 370/348 |
| 8,019,352 B2* | 9/2011 | Rappaport et al. ......... | 455/456.1 |
| 8,174,982 B2* | 5/2012 | Buddhikot et al. ........... | 370/235 |
| 8,200,222 B2* | 6/2012 | Kim .............................. | 455/436 |
| 8,203,943 B2* | 6/2012 | Dec ............................... | 370/230 |
| 2002/0091636 A1* | 7/2002 | Bullard ........................... | 705/40 |
| 2002/0188562 A1* | 12/2002 | Igarashi et al. ................ | 705/40 |
| 2002/0191562 A1* | 12/2002 | Kumaki et al. ............... | 370/331 |

(Continued)

FOREIGN PATENT DOCUMENTS

| | | |
|---|---|---|
| KR | 10-0549501 | 10/2003 |
| KR | 10-0684314 | 11/2004 |

(Continued)

OTHER PUBLICATIONS

Notice of Patent Grant dated Dec. 18, 2013 in connection with Korean Patent application No. 10-2008-0006464; 6 pages.

*Primary Examiner* — Ashford S Hayles

(57) ABSTRACT

An apparatus and method for processing accounting in a wireless communication system are provided. The method includes creating an accounting data base (DB) for a mobile station (MS), determining whether a state transition of the MS occurs, if the state transition of the MS occurs, updating state information in the accounting DB, and transmitting the accounting information including the state information to an accounting server.

18 Claims, 8 Drawing Sheets

(56) References Cited

U.S. PATENT DOCUMENTS

| | | | |
|---|---|---|---|
| 2003/0152084 A1* | 8/2003 | Lee et al. | 370/395.21 |
| 2003/0166408 A1* | 9/2003 | Zhang et al. | 455/522 |
| 2004/0018829 A1* | 1/2004 | Raman et al. | 455/406 |
| 2004/0264405 A1* | 12/2004 | MacGregor | 370/328 |
| 2005/0243759 A1* | 11/2005 | Torarp et al. | 370/328 |
| 2005/0270981 A1* | 12/2005 | Shaheen et al. | 370/241 |
| 2006/0019679 A1* | 1/2006 | Rappaport et al. | 455/456.5 |
| 2006/0036520 A1* | 2/2006 | O'Neill | 705/34 |
| 2006/0072573 A1* | 4/2006 | Broberg et al. | 370/392 |
| 2006/0126554 A1* | 6/2006 | Motegi et al. | 370/328 |
| 2006/0252410 A1* | 11/2006 | Bakita et al. | 455/411 |
| 2007/0253434 A1* | 11/2007 | Oswal et al. | 370/401 |
| 2008/0052206 A1* | 2/2008 | Edwards et al. | 705/34 |
| 2008/0082641 A1* | 4/2008 | Meijer et al. | 709/220 |
| 2008/0126098 A1* | 5/2008 | Deng et al. | 704/270.1 |
| 2008/0147524 A1* | 6/2008 | Connelly | 705/30 |
| 2008/0151931 A1* | 6/2008 | Moran et al. | 370/465 |
| 2008/0183604 A1* | 7/2008 | Chou | 705/30 |
| 2008/0186893 A1* | 8/2008 | Kolding et al. | 370/311 |
| 2008/0198809 A1* | 8/2008 | Kim | 370/331 |
| 2008/0268863 A1* | 10/2008 | Pedersen et al. | 455/452.2 |
| 2008/0273493 A1* | 11/2008 | Fong | 370/330 |
| 2009/0030820 A1* | 1/2009 | Hamel et al. | 705/34 |
| 2009/0080374 A1* | 3/2009 | Lee et al. | 370/328 |
| 2009/0164355 A1* | 6/2009 | Mo et al. | 705/30 |
| 2009/0252070 A1* | 10/2009 | Connors et al. | 370/311 |
| 2009/0262687 A1* | 10/2009 | Furata | 370/328 |
| 2012/0026973 A1* | 2/2012 | Bontu et al. | 370/331 |

FOREIGN PATENT DOCUMENTS

| | | |
|---|---|---|
| KR | 20070103826 | 10/2007 |
| KR | 10-0885057 | 10/2008 |

* cited by examiner

APPARATUS AND METHOD FOR PERFORMING ACCOUNTING IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jan. 22, 2008 and assigned Serial No. 10-2008-0006464, the entire disclosure of which is hereby incorporated by reference.

TECHNICAL FIELD OF THE INVENTION

The present invention relates to an apparatus and method for processing accounting in a wireless communication system. More particularly, the present invention relates to an apparatus and method for managing a state of a mobile station (MS) according to accounting information in a wireless communication system.

BACKGROUND OF THE INVENTION

Today, many wireless communication techniques are being proposed to achieve high-speed mobile communication. Among them, an Orthogonal Frequency Division Multiplexing (OFDM)/Orthogonal Frequency Division Multiple Access (OFDMA) scheme is accepted as one of the most promising techniques for a next generation wireless communication. The OFDM scheme is expected to be widely used in future wireless communication techniques, and is currently used as a standard in the Institute of Electrical and Electronics Engineers (IEEE) 802.16-based Wireless Metropolitan Area Network (WMAN) known as the 3.5 generation technology.

The OFDM/OFDMA-based broadband wireless communication system can create a plurality of Service Flows (SFs) for each user (or mobile station (MS)). The created plurality of SFs can support different Quality of Services (QoSs) or service classes.

In communication systems, accounting information is used as a reference for imposing a service charge to a user. Thus, accuracy is required in the accounting information, and an accounting process needs to be performed in more detailed steps to provide a differentiated service to the user.

A conventional accounting method is based on a single service in which accounting information is generated under the assumption that one service is activated for an MS. Therefore, the convention accounting method cannot be used when the MS activates a plurality of services. A method of generating an accounting session for each SF has recently been proposed, but this method has a drawback in that accounting is not accurate since an SF state and a Media Access Control (MAC) state of the MS are not taken into account.

In a broadband wireless communication system, the MAC state of the MS is classified into an awake state, a sleep state, and an idle state, and the SF state is classified into a provisioned state, an admitted state, and an active state.

The awake state denotes a state in which there is a traffic flow per the MS. If there is no traffic flow during a sleep timer period in the awake state, the MS transitions from the awake state to the sleep state. If there is no traffic flow during an idle timer period, the MS transitions to the idle state. When in the idle state, a radio link connection is released but SF information is maintained in an Access Service Network-Gateway (ASN_GW).

The active state denotes a state in which there is a traffic flow per the SF. The admitted state denotes a state in which a Traffic Connection IDentifier or a Transport Connection IDentifier (TCID) is allocated and a resource is reserved. The provisioned state denotes a state in which only a Service Flow IDentification (SFID) is allocated. Herein, if there is no traffic flow during a preset time period in the active state, the SF may transition from the active state to the admitted state, and if there is no traffic flow during a longer time period, the SF may transition to the provisioned state. Further, when a state transition occurs, the MS and an Access Service Network (ASN) can transition to another state after exchanging a message according to the state transition.

In the conventional accounting processing method, an SF is generated when a transition occurs from the idle state to the awake state, and the SF is terminated when a transition occurs from the awake state to the idle state. That is, the sleep state and the awake state are equally treated, and likewise, the admitted state and the active state are equally treated. However, accounting may not be imposed in the admitted state since resources are not actually used, or may be imposed since SF generation is limited in another aspect. In addition, since the sleep state uses less resources than the active state, accounting may be differently applied according to a policy of a service provider. To apply various accounting policies, an accounting policy has to be individually applied to each MAC state and each SF state. In addition, in the conventional method, an accounting session has to be released and generated whenever a state transition occurs, which leads to a problem in that a signaling overhead increases. Accordingly, there is a need for a flexible and optimized accounting processing method in which an accounting policy can be individually applied to each MAC state and each SF state and in which a signaling overhead can be reduced.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for managing a Media Access Control (MAC) state of a mobile station (MS) for accounting information in a wireless communication system.

Another aspect of the present invention is to provide an apparatus and method for managing a state of a Service Flow (SF) for accounting information in a wireless communication system.

Another aspect of the present invention is to provide an apparatus and method for managing a state of a Quality of Service (QoS) class for accounting information in a wireless communication system.

Another aspect of the present invention is to provide an apparatus and method for reducing a signaling overhead depending on accounting processing in a wireless communication system.

In accordance with an aspect of the present invention, a method of performing accounting in a wireless communication is provided. The method includes generating an accounting session in a network access process of an MS, determining whether a MAC state of the MS transitions while accounting information on the MS is collected, updating state information of the accounting session when the MAC state of the MS transitions, and transmitting the accounting information including the state information of the accounting session to an accounting server.

In accordance with another aspect of the present invention, a method of performing accounting in a wireless communication system is provided. The method includes generating an accounting sub-session when an SF is generated for an MS, updating state information of the accounting sub-session when an SF state transitions, and transmitting accounting information including the state information of the accounting sub-session to an accounting server.

In accordance with another aspect of the present invention, a method of performing accounting in a wireless communication system is provided. The method includes determining whether a QoS class for an MS changes, updating state information of a QoS when the QoS class changes, and transmitting the state information of the QoS to an accounting server.

In accordance with another aspect of the present invention, a method of processing accounting in a wireless communication system is provided. The method includes creating an accounting data base (DB) for an MS, determining whether a state transition of the MS occurs, if the state transition of the MS occurs, updating state information in the accounting DB, and transmitting the accounting information including the state information to an accounting server.

In accordance with another aspect of the present invention, an apparatus for processing accounting of a base station (BS) in a wireless communication system is provided. The apparatus includes an accounting table for managing an accounting session for each MS, a state processor for managing a MAC state for each MS, and an accounting processor for updating state information of a specific accounting session by accessing the accounting table when a MAC state of any MS transitions.

In accordance with another aspect of the present invention, an apparatus for processing accounting of an Access Service Network-Gateway (ASN_GW) in a wireless communication system is provided. The apparatus includes an accounting DB for managing accounting information for each MS, wherein the accounting information includes state information of an accounting session and state information of an accounting sub-session, a state manager for managing state per SF for each MS, and an accounting processor for updating state information of a specific accounting sub-session by accessing the accounting DB when an SF state of any MS transitions.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an accounting processing method considering a state of a mobile station (MS) in a broadband wireless communication system will be described. The state of the MS includes a Media Access Control (MAC) state, a Service Flow (SF) state, a Quality of Service (QoS) state, and so forth.

The SF state and the MAC state of the MS may be defined differently according to a standardization group and a system in use. It is assumed hereinafter that the MAC state of the MS is classified into an awake state, a sleep state, and an idle state, and the SF state is classified into a provisioned state, an admitted state, and an active state.

In the following description, a network entity (NE) is a term defined according to functions, and the term may vary depending on a standardization group or operator's intention. For example, a base station (BS) may also be referred to as an Access Point (AP), a Radio Access Station (RAS), and a Node-B. In addition, an Access Service Network-Gateway (ASN_GW) may also be referred to as a Radio Network Controller (RNC), a Base Station Controller (BSC) and an Access Control Router (ACR). The ASN_GW may also function as a router in addition to the BS controller.

Figure 1:
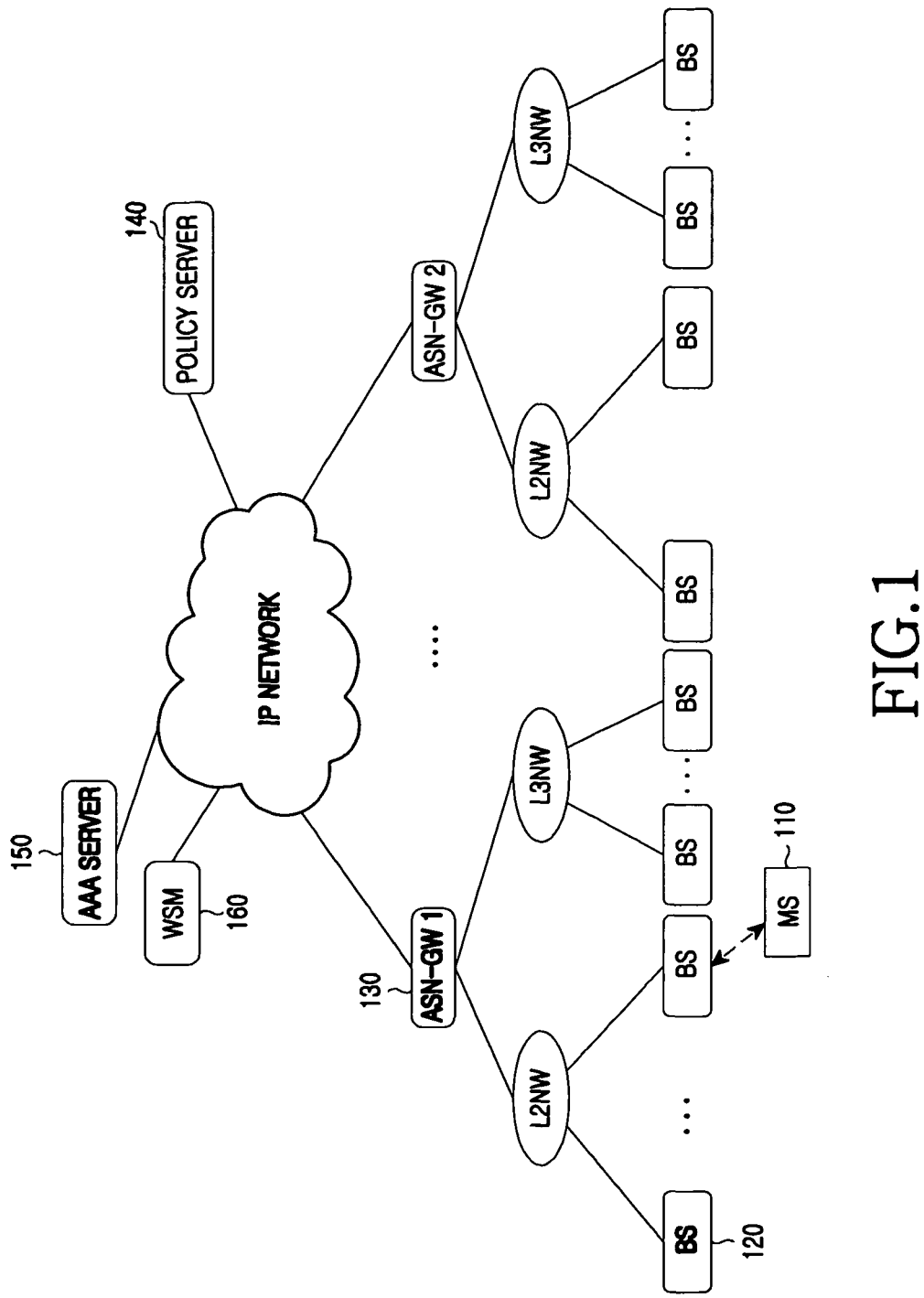
FIG. 1 illustrates a network configuration according to an exemplary embodiment of the present invention.

FIG. 1 illustrates a network configuration according to an exemplary embodiment of the present invention.

Referring to FIG. 1, a network consists of an MS 110, a BS 120, an ASN_GW 130, a policy server 140, an Authentication, Authorization, and Accounting (AAA) server 150, and a WiBro System Manager (WSM) 160. A network consisting of the BS 120 and the ASN_GW 130 may be defined as an Access Service Network (ASN). The WSM 160 may be referred to as an Element Management System (EMS) or an Operation Management Center (OMC). The policy server 140 may consist of a separate server as shown in the figure, or may be incorporated as an internal function of another NE.

The AAA server 150 performs authentication and accounting on the MS by interoperating with the ASN_GW 130. When authentication on the MS is successful, the AAA server 150 searches for an accounting policy on a corresponding subscriber MS and pre-agreed service information, and transmits the found accounting policy and agreed service information to the ASN_GW 130. Further, the AAA server 150 processes accounting information provided from the ASN_GW 130. A Common Open Policy Service (COPS) interface, a Remote Authentication Dial In User Service (RADIUS) interface or a diameter interface may be used between the AAA server 150 and the ASN.

The policy server 140 provides policy information (e.g., QoS policy information) determined by a service provider (or operator) to a corresponding NE. The COPS interface, the RADIUS interface or the diameter interface may be used between the policy server 140 and the ASN.

The WSM 160 delivers information (e.g., program loading data) related to the network configuration to the ASN, and manages the ASN_GW 130 and the BS 120 which constitute the ASN. The COPS interface, the RADIUS interface or the diameter interface may be used between the WSM 160 and the ASN.

The ASN_GW 130 transmits to the BS 120 a traffic from a Core Service Network (CSN), and transmits to the CSN a traffic from the BS 120. In this case, for each MS, the ASN_GW 130 manages an SF, a connection, and a mobility. A unique SF may be generated for each of uplink and downlink connections. The ASN_GW 130 generates and manages an accounting session and an accounting sub-session for each MS, and delivers to the AAA server 150 the accounting information collected for each MS. In addition to general accounting data (i.e., an amount of traffic serviced, and so forth), the accounting information also includes state information on each MAC state (i.e., state duration time, and so forth) and state information on each SF.

The BS 120 transmits to the MS 110 a traffic from the ASN_GW 130, and transmits to the ASN_GW 130 a traffic from the MS 110. The BS 120 is connected to the ASN_GW 130 in a wired fashion, and is connected to the MS 110 in a wireless fashion. The BS 120 performs scheduling according to a MAC-layer QoS, and thus allocates resources to the MS 110. The BS 120 collects the accounting information according to an accounting policy applied to a corresponding subscriber, and delivers the collected accounting information to the ASN_GW 130 according to a predetermined period, a request, or a specific event. A network between the ASN_GW 130 and the BS 120 may be constructed of a Layer 2 (L2: Ethernet) network or a Layer 3 (L3: Internet Protocol (IP)) network.

The MS 110 performs a Dynamic Service Addition (DSA) process with the BS 120 to generate an SF, and performs traffic exchange through the generated SF. Further, the MS 110 changes the SF state by performing a Dynamic Service Change (DSC) process.

Although not shown in FIG. 1, it is apparent that NEs (i.e., a Dynamic Host Configuration Protocol (DHCP), a home agent (HA), and a foreign agent (FA)) for allocating an IP address to the MS and a Domain Name Server (DNS) for managing a mapping relationship between a Network Access Identifier (NAI) and the IP address can be provided.

In the present invention, it is assumed that the accounting session is allocated for each MS (per user), and the sub-session is allocated for each SF (per flow). The ASN_GW 130 generates the accounting session in a data base (DB) in an initial network entry process of the MS 110 and generates the accounting sub-session in the DB in an SF generation process. In addition to general accounting data, the DB can manage state information, as shown in Table 1 below, for each accounting session and each accounting sub-session.

TABLE 1

| Accounting Session | Accounting Sub-session |
|---|---|
| current MAC state indicator | current SF state indicator |
| transition time of current MAC state | transition time of current SF state |
| sleep state cumulative time | admitted state cumulative time |
| awake state cumulative time | active state cumulative time |
| idle state cumulative time | provisioned state cumulative time |

The sleep state, the awake state, and the idle state belong to the MAC state that can be known to the BS 120, and thus accounting statistics on a corresponding MAC state are generated by the BS 120. In addition, the admitted state, the active state, and the provisioned state belong to the SF state which can be known to both the BS 120 and the ASN_GW 130, and thus corresponding accounting statistics can be generated by either the BS 120 or the ASN_GW 130. It is assumed hereinafter that accounting statistics for the accounting sub-session are generated by the ASN_GW 130.

According to another embodiment of the present invention, the DB can be updated by using only state information for each sub-session without having to manage state information for each session. For example, when in the admitted state, the SF state cumulative time may be updated irrespective of the awake state and the sleep state. When in the activate state, the SF state cumulative time may be updated by distinguishing the awake state and the sleep state, so that the active state cumulative time is updated in the awake state and the admitted state cumulative time is updated in the sleep state.

Examples of operations based on the DB of Table 1 above are as follows. For example, when the SF is in the admitted state, the same accounting policy can be applied since there is no difference in a resource usage rate in the awake state and the sleep state. In addition, when in the sleep state, the SF of the admitted state and the SF in the active state have the same resource usage rate. Thus, when in the sleep state, the same accounting policy can be applied to the SFs of the admitted state and the active state.

Figure 2:
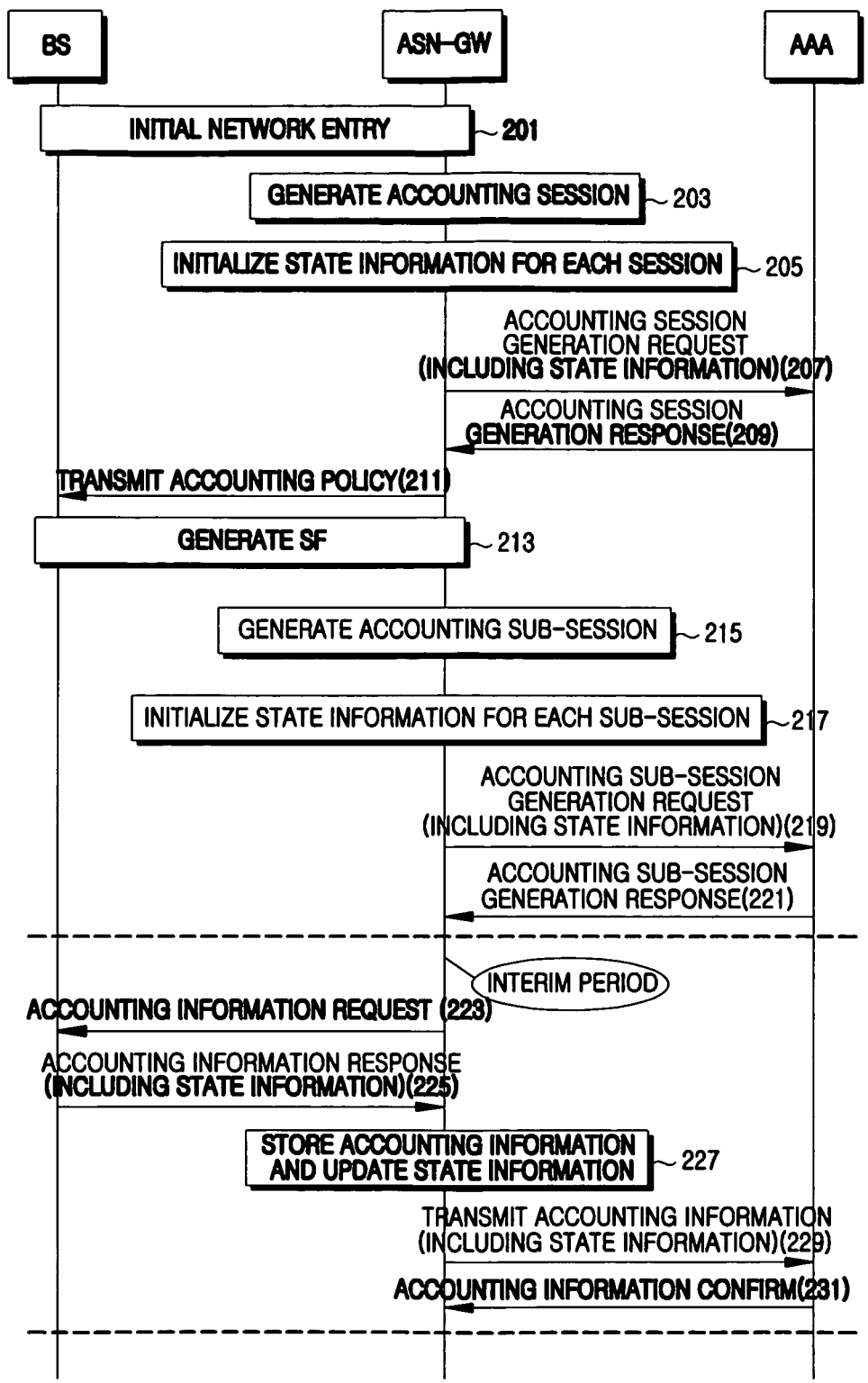
FIG. 2 illustrates a process of generating an accounting session and a sub-session in a wireless communication system according to an exemplary embodiment of the present invention.

FIG. 2 illustrates a process of generating an accounting session and a sub-session in a wireless communication system according to an exemplary embodiment of the present invention.

Referring to FIG. 2, in an initial network entry process of an MS, the BS 120 exchanges signaling depending on the initial network entry of the MS with the ASN_GW 130 in step 201. Upon completing the initial network entry of the MS, the ASN_GW 130 generates an accounting session for the MS in step 203, and initializes state information of the accounting session in step 205. As shown in Table 1 above, the state information of the accounting session includes a current MAC state indicator, a transition time of a current MAC state, a sleep state cumulative time, an awake state cumulative time, an idle state cumulative time, and so forth.

After initializing the state information of the accounting session, the ASN_GW 130 transmits to the AAA server 150 a message (i.e., an accounting session generation request message) for requesting generation of the accounting session in step 207, and receives an accounting session generation response message from the AAA server 150 as a response in step 209. The accounting session response message may include information on an accounting policy (e.g., an accounting information collection period, accounting information type to be collected, and so forth) applied to the MS.

Upon receiving the accounting session generation response message, the ASN_GW 130 delivers to the BS 120 the accounting policy applied to the MS in step 211. The BS 120 prepares accounting according to the accounting policy.

Thereafter, when a service addition request is transmitted from the MS or a CSN, the ASN_GW 130 generates an SF (i.e., SFID allocation) in step 213, and reports the generated SF to the BS 120. Then, the BS 120 maps a Traffic CID or a Transport CID (TCID) for the SF, and reports the mapping result to the MS.

After generating the SF, the ASN_GW 130 generates an accounting sub-session in step 215, and initializes state information of the accounting sub-session in step 217. As shown in Table 1 above, the state information of the accounting sub-session may include a current SF state indicator, a transition time of a current SF state, an admitted state cumulative time, an active state cumulative time, a provisioned state cumulative time, and so forth.

After initializing the state information of the accounting sub-session, the ASN_GW 130 transmits to the AAA server 150 a message (i.e., an accounting sub-session generation request message) for requesting generation of the accounting sub-session in step 219, and receives an accounting sub-session generation response message from the AAA server 150 as a response in step 221. The accounting sub-session message may include accounting information collected from a previous accounting reporting time to a current time. Thereafter, the ASN_GW 130 and the BS 120 collect the accounting information according to an accounting policy applied to the MS. For example, a traffic amount (i.e., a packet size, an octet size, and so forth) serviced through a corresponding SF can be collected. Further, the ASN_GW 130 detects an SF state transition, and updates the state information of the accounting sub-session according to the state transition. In addition, the BS 120 detects a state transition of the MS, and updates the state information of the accounting session according to a MAC state transition.

When an interim period (i.e., an accounting information collection period) is reached while the accounting information is collected, the ASN_GW 130 transmits an accounting information request message to the BS 120 in step 223. Then, the BS 120 transmits an accounting information response message including the accounting information (or accounting statistics) collected by the BS 120 to the ASN_GW 130 in step 225. In addition to general accounting data, the accounting information response message includes state information (i.e., a current MAC state indicator, a transition time of a current MAC state, a sleep state cumulative time, an awake state cumulative time, and so forth) of the accounting session. As such, the BS 120 can deliver the accounting information collected by the BS 120 itself to the ASN_GW 130 at the request of the ASN_GW 130. According to another exemplary embodiment, the BS 120 may deliver the accounting information collected by the BS 120 itself to the ASN_GW 130 according to the interim period. In the interim period, if the MAC state transition occurs in the BS 120 or if there is a traffic omitted in transmission, the BS 120 can transmit the state information and information on the omitted traffic to the ASN_GW 130.

The ASN_GW 130 updates an accounting data base (DB) according to the accounting information received from the BS 120 in step 227. Further, the ASN_GW 130 transmits to the AAA server 150 a message (i.e., an accounting information message) including the updated accounting information in step 229, and receives an accounting information confirm message from the AAA server 150 as a response in step 231. In addition to general accounting data, the accounting information message includes state information of an accounting session and state information of an accounting sub-session.

Figure 3:
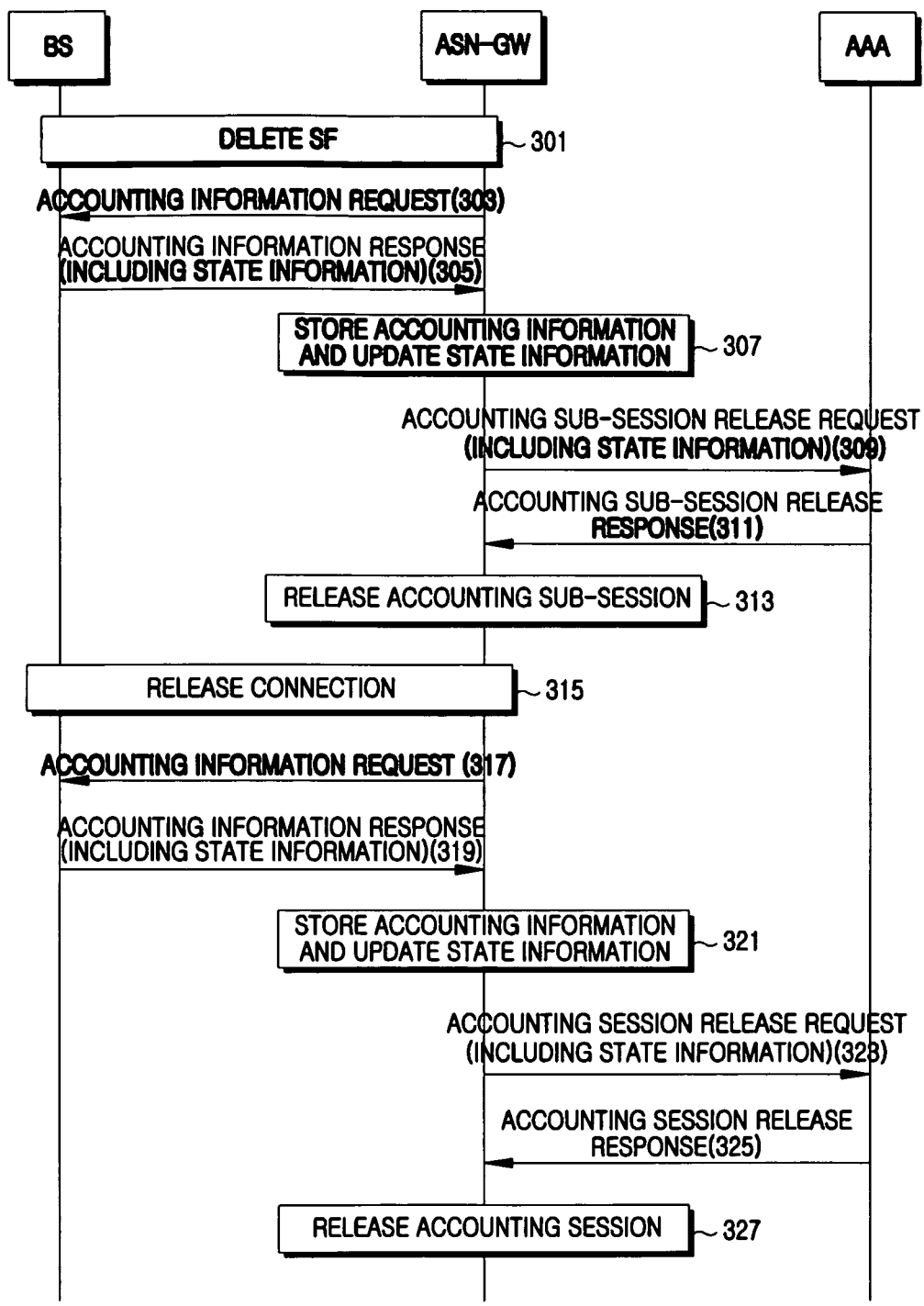
FIG. 3 illustrates a process of deleting an accounting session and an accounting sub-session in a wireless communication system according to an exemplary embodiment of the present invention.

FIG. 3 illustrates a process of deleting an accounting session and an accounting sub-session in a wireless communication system according to an exemplary embodiment of the present invention.

Referring to FIG. 3, when a service deletion request for an MS is transmitted from the MS or a CSN, the ASN_GW 130 deletes a corresponding SF in step 301. When the SF is deleted, the ASN_GW 130 transmits a message (i.e., an accounting information request message) for requesting accounting information on the MS to the BS 120 in step 303. Then, the BS 120 transmits an accounting information response message including the accounting information on the MS to the ASN_GW 130 in step 305. In addition to general accounting data, the accounting information response message includes state information (i.e., a current MAC state indicator, a transition time of a current MAC state, a sleep state cumulative time, an awake state cumulative time, an idle state cumulative time, and so forth) of the accounting session.

The ASN_GW 130 updates an accounting DB according to the accounting information received from the BS 120 in step 307. Then, the ASN_GW 130 transmits to the AAA server 150 a message (i.e., an accounting sub-session release request message) for requesting release of an accounting sub-session for the SF in step 309, and receives from the AAA server 150 an accounting sub-session release response message as a response in step 311. The accounting sub-session release request message may include the updated accounting information. Upon receiving the accounting sub-session release response message, the ASN_GW 130 releases (or deletes) a specific sub-session of the MS from an accounting DB in step 313.

When a connection release request of the MS is requested from the BS 120, the ASN_GW 130 exchanges signaling for releasing the connection of the MS with the BS 120 in step 315. The ASN_GW 130 transmits a message (i.e., an accounting information request message) for requesting the accounting information on the MS in step 317. Then, the BS 120 transmits an accounting information response message including the accounting information on the MS to the ASN_GW 130 in step 319. In addition to general accounting data, the accounting information response message includes state information of the accounting session.

The ASN_GW 130 updates an accounting DB according to the accounting information received from the BS 120 in step 321. Further, the ASN_GW 130 transmits a message (i.e., an accounting session release request message) for requesting release of the accounting session for the MS to the AAA server 150 in step 323, and receives an accounting session release response message from the AAA server 150 as a response in step 325. The accounting session release request message can include the updated accounting information. Upon receiving the accounting session release response message, the ASN_GW 130 releases (or deletes) the accounting session of the MS from the accounting DB in step 327.

Figure 4:
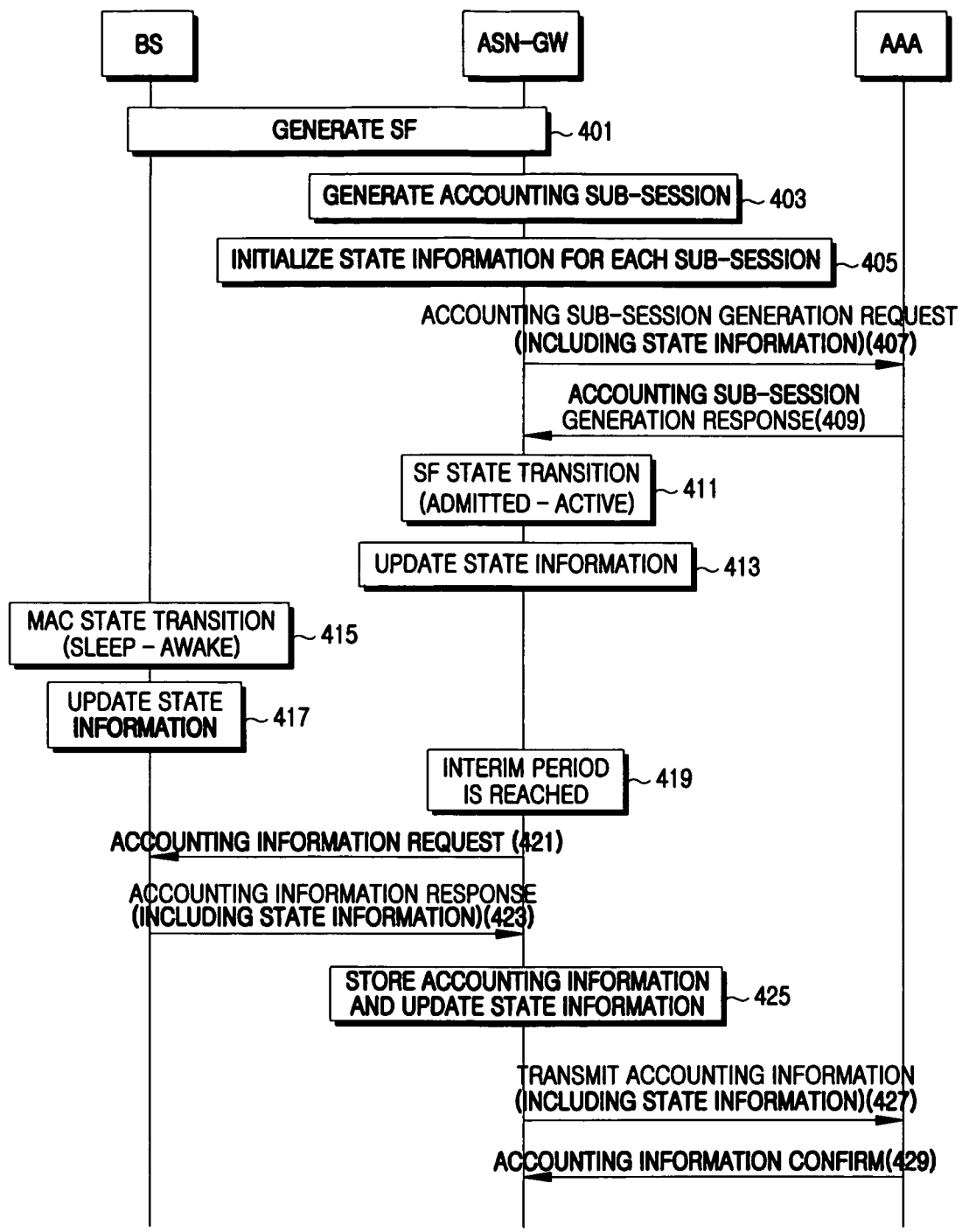
FIG. 4 illustrates an accounting process based on a state transition in a wireless communication system according to an exemplary embodiment of the present invention.

FIG. 4 illustrates an accounting process depending on a state transition in a wireless communication system according to an exemplary embodiment of the present invention.

Referring to FIG. 4, when a service addition request is transmitted from a MS or a CSN, the ASN_GW 130 generates an SF (i.e., SFID allocation) in step 401, and reports the generated SF to the BS 120. Then, the BS 120 maps a TCID for the SF, and reports the mapping result to the MS.

After generating the SF, the ASN_GW 130 generates an accounting sub-session in step 403, and initializes state information of the accounting sub-session in step 405. As shown in Table 1 above, the state information of the accounting sub-session may include a current SF state indicator, a transition time of a current SF state, an admitted state cumulative time, an active state cumulative time, a provisioned state cumulative time, and so forth.

After initializing the state information of the accounting sub-session, the ASN_GW 130 transmits to the AAA server 150 a message (i.e., an accounting sub-session generation request message) for requesting generation of the accounting sub-session in step 407, and receives an accounting sub-session generation response message from the AAA server 150 as a response in step 409. The accounting sub-session message may include accounting information collected from a previous accounting reporting time to a current time. Thereafter, the ASN_GW 130 and the BS 120 collect the accounting information according to an accounting policy applied to the MS. For example, a traffic amount (i.e., a packet size, an octet size, and so forth) serviced through a corresponding SF can be collected.

While the accounting information is collected as described above, the ASN_GW 130 determines whether an SF state transitions in step 411. It is assumed herein that the SF state transitions from the admitted state to the active state. When the SF state transitions, the ASN_GW 130 updates state information of the accounting sub-session in step 413. Upon generation of a state transition event, the state information can be updated similarly to a pseudo code of Table 2 below.

TABLE 2 duration time = current time − stateDB.current state transition time
stateDB.state cumulative time [state before transition] = stateDB.state cumulative time [state before transition] +duration time
stateDB.current state indictor = state after transition
stateDB.current state transition time = current time While the accounting information is collected, the BS 120 determines whether the MAC state of the MS transitions in step 415. It is assumed herein that the MAC state transitions from the sleep state to the awake state. When the MAC state transitions, the BS 120 updates the state information of the accounting session in step 417. The state information of the accounting session can be updated as shown in Table 2 above.

The ASN_GW 130 determines whether an interim period is reached in step 419. When the interim period is reached, the ASN_GW 130 transmits an accounting information request message to the BS 120 in step 421. Then, the BS 120 transmits an accounting information response message including the accounting information (or accounting statistics) collected by the BS 120 to the ASN_GW 130 in step 423. In addition to general accounting data, the accounting information response message includes state information (i.e., a current MAC state indicator, a transition time of a current MAC state, a sleep state cumulative time, an awake state cumulative time, an idle state cumulative time, and so forth) of the accounting session. As such, the BS 120 can deliver the accounting information collected by the BS 120 itself to the ASN_GW 130 at the request of the ASN_GW 130. According to another exemplary embodiment, the BS 120 may deliver the accounting information collected by the BS 120 itself to the ASN_GW 130 according to the interim period. In the interim period, if a MAC state transition occurs in the BS 120 or if there is a traffic omitted in transmission, the BS 120 can transmit the state information and information on the omitted traffic to the ASN_GW 130.

The ASN_GW 130 updates an accounting DB according to the accounting information received from the BS 120 in step 425. Further, the ASN_GW 130 transmits a message (i.e., an accounting information message) including the updated accounting information to the AAA server 150 in step 427, and receives an accounting information confirm message from the AAA server 150 as a response in step 429. In addition to general accounting data, the accounting information message includes state information of an accounting session and state information of an accounting sub-session.

Although it is described in the exemplary embodiment of FIG. 4 that the accounting information is reported to the AAA server 150 when the interim period is reached irrespective of the state transition, the accounting information may also be reported to a corresponding NE immediately after the state transition occurs. That is, when the MAC state of the MS transitions, the BS 120 updates the state information and reports the updated state information to the ASN_GW 130. Likewise, when the SF state transitions, the ASN_GW 130 may update the state information and report the updated state information to the AAA server 150.

Figure 5:
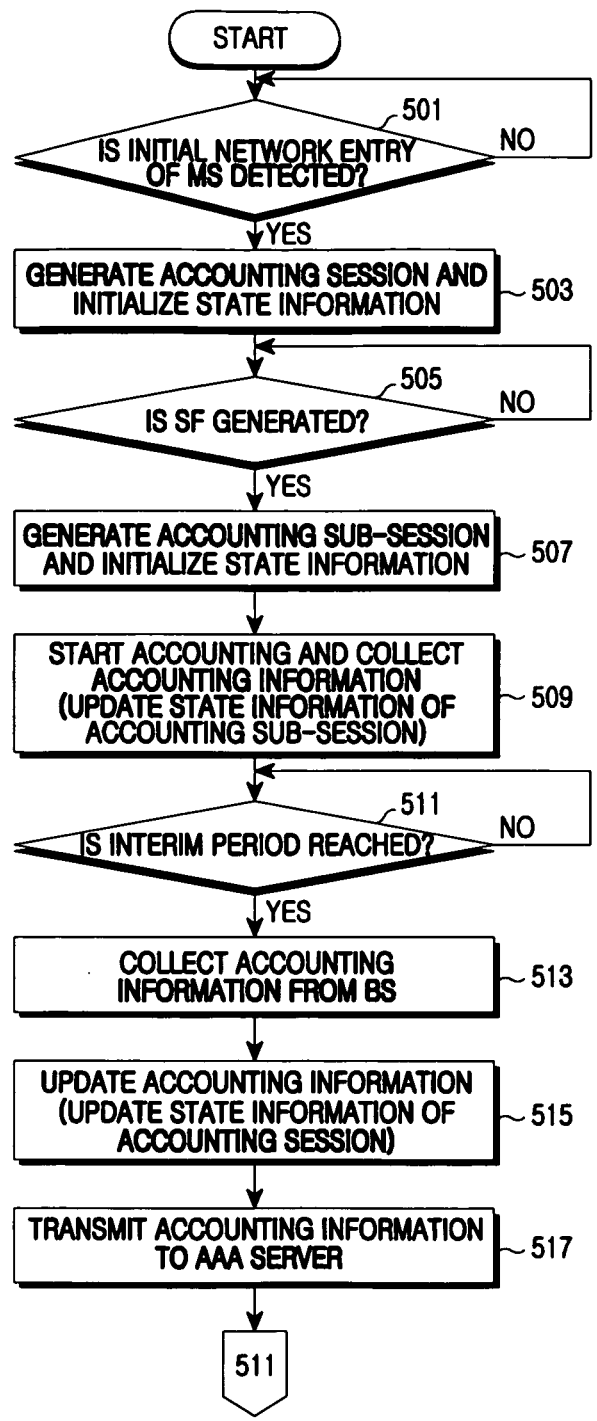
FIG. 5 illustrates an accounting process of an Access Service Network-Gateway (ASN_GW) in a wireless communication system according to an exemplary embodiment of the present invention.

FIG. 5 illustrates an accounting process of an ASN_GW in a wireless communication system according to an exemplary embodiment of the present invention.

Referring to FIG. 5, the ASN_GW 130 detects an initial network entry of an MS in step 501. Upon completing the initial network entry of the MS, the ASN_GW 130 generates an accounting session for the MS and initializes state information of the accounting session in step 503. As shown in Table 1 above, the state information of the accounting session includes a current MAC state indicator, a transition time of a current MAC state, a sleep state cumulative time, an awake state cumulative time, an idle state cumulative time, and so forth.

After initializing the state information of the accounting session, the ASN_GW 130 determines whether an SF is generated for the MS in step 505. When the SF is generated, in step 507, the ASN_GW 130 generates an accounting sub-session, and initializes state information of the accounting sub-session. As shown in Table 1 above, the state information of the accounting sub-session may include a current SF state indicator, a transition time of a current SF state, an admitted state cumulative time, an active state cumulative time, a provisioned state cumulative time, and so forth.

After initializing the accounting sub-session, proceeding to step 509, the ASN_GW 130 starts accounting, and collects accounting information according to an accounting policy applied to the MS. For example, a traffic amount (i.e., a packet size, an octet size, and so forth) serviced through a corresponding SF can be collected. Further, the ASN_GW 130 detects an SF state transition, and updates the state information of the accounting sub-session when the state transition occurs.

While the accounting information is collected, the ASN_GW 130 determines whether an interim period is reached in step 511. When the interim period is reached, the ASN_GW 130 receives the accounting information collected by the BS 120 in step 513. In addition to general accounting data, the accounting information collected by the BS 120 includes state information (i.e., a current MAC state indicator, a transition time of a current MAC state, a sleep state cumulative time, an awake state cumulative time, idle state cumulative time, and so forth) of the accounting session.

The ASN_GW 130 updates an accounting DB according to the accounting information received from the BS 120 in step 515. Further, the ASN_GW 130 transmits the updated accounting information to the AAA server 150 in step 517.

Figure 6:
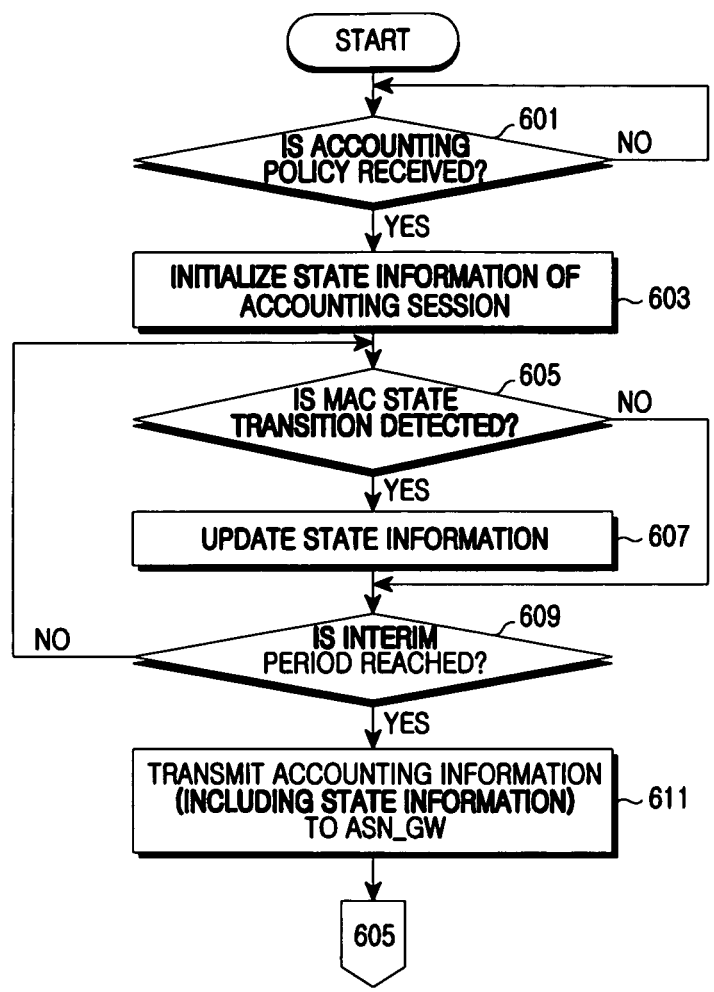
FIG. 6 illustrates an accounting process of a base station (BS) in a wireless communication system according to an exemplary embodiment of the present invention.

FIG. 6 illustrates an accounting process of a BS in a wireless communication system according to an exemplary embodiment of the present invention.

Referring to FIG. 6, the BS 120 determines whether an accounting policy for an MS is received in step 601. Upon receiving the accounting policy, proceeding to step 603, the BS 120 initializes state information of an accounting session and prepares accounting according to the accounting policy. Thereafter, when an SF is generated and a traffic starts to flow, accounting is started. For example, accounting is performed by collecting a traffic amount (i.e., a packet size, an octet size, and so forth) serviced through a corresponding SF.

While the accounting information is collected as described above, the BS 120 detects a MAC state transition of the MS in step 605. If the MAC state transition is not detected, proceeding to step 609, the BS 120 determines whether an interim period is reached. If the MAC state transition is detected, proceeding to step 607, the BS 120 updates state information (i.e., a current MAC state indicator, a transition time of a current MAC state, a sleep state cumulative time, an awake state cumulative time, idle state cumulative time, and so forth) of the accounting session. In this case, the BS 120 updates the state information of the accounting session as shown in Table 2 above.

When the BS 120 determines whether the interim period is reached in step 609, if the interim period is not reached, the procedure returns to step 605, and the BS 120 re-performs the subsequent steps. If the interim period is reached, proceeding to step 611, the BS 120 reports to the ASN_GW 130 accounting information collected from a previous reporting time to a current time. In this case, in addition to general accounting data, the accounting information includes state information of the accounting session.

Figure 7:
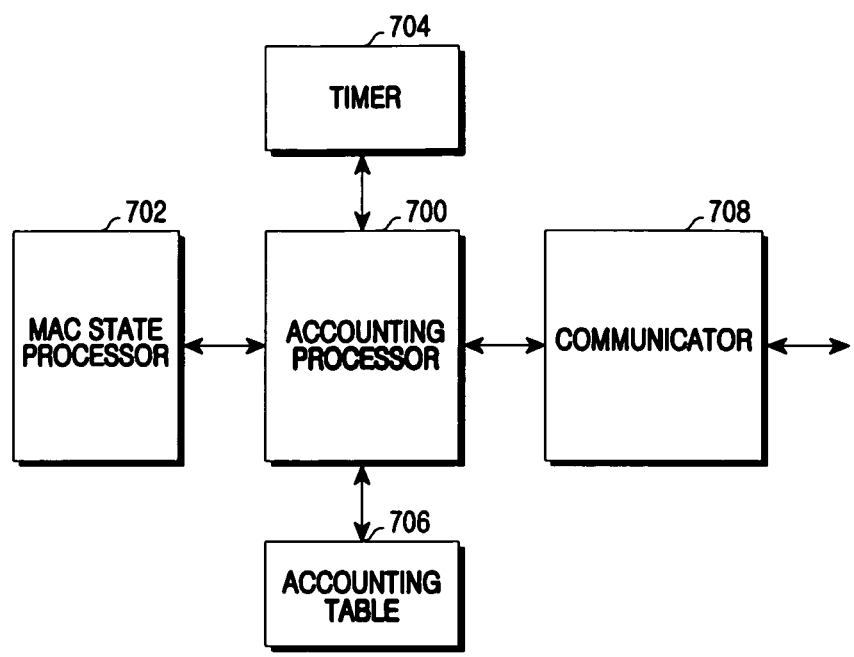
FIG. 7 illustrates a structure of a BS in a wireless communication system according to an exemplary embodiment of the present invention.

FIG. 7 illustrates a structure of a BS in a wireless communication system according to an exemplary embodiment of the present invention.

Referring to FIG. 7, the BS includes an accounting processor 700, a MAC state processor 702, a timer 704, an accounting table 706, and a communicator 708. This is shown by focusing on the accounting process.

The communicator 708 is an interface unit for communicating with a different NE. The communicator 708 generates a message according to a defined protocol to transmit the message to the different entity, and analyzes message received from the different NE. If the received message is related to accounting, the communicator 708 provides a message analysis result to the accounting processor 700. Further, the communicator 708 generates a message related to accounting and transmits the generated message to the NE.

The MAC state processor 702 manages a MAC state for each MS currently connected to a network. When a MAC state of any MS transitions, the MAC state processor 702 reports this to the accounting processor 700. The timer 704 manages a variety of times (or timers) required in a system operation. The accounting table 706 manages accounting information on each MS. In addition to general accounting data, the accounting information includes state information (i.e., a current MAC state indicator, a transition time of a current MAC state, a sleep state cumulative time, an awake state cumulative time, idle cumulative time, and so forth) of the accounting session.

With respect to each MS, the accounting processor 700 collects the accounting information (i.e., an amount of traffic serviced, and so forth) for each SF, and updates the accounting table 706 according to the collection result. When the interim period is reached, the accounting processor 700 reports the accounting information collected from a previous reporting time to a current time to the ASN_GW 130 of FIG. 1. When a MAC state transition of any MS is reported by the MAC state processor 702, the accounting processor 700 accesses the accounting table 706 and updates the state information of the accounting session for the MS.

Figure 8:
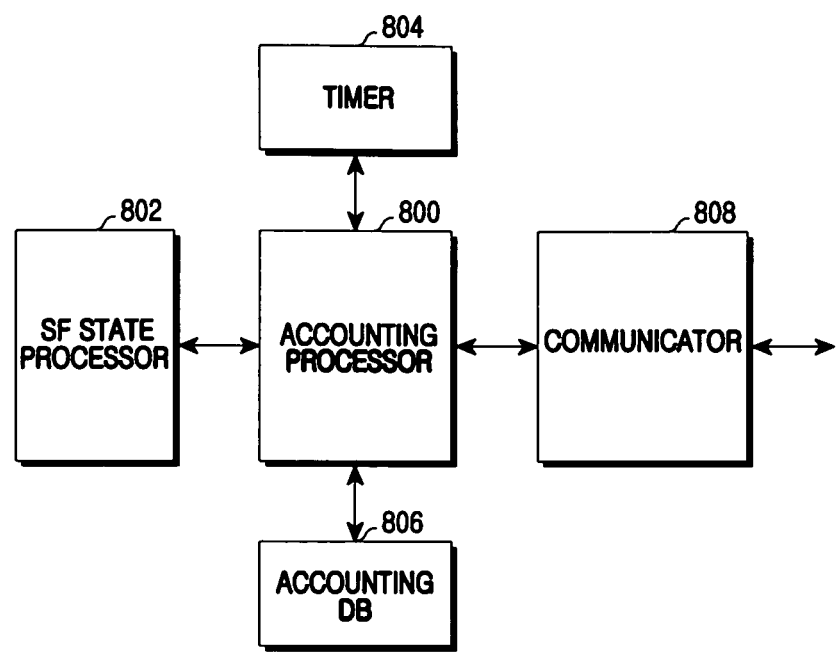
FIG. 8 illustrates a structure of an ASN_GW in a wireless communication system according to an exemplary embodiment of the present invention.

FIG. 8 illustrates a structure of an ASN_GW in a wireless communication system according to an exemplary embodiment of the present invention.

Referring to FIG. 8, the ASN_GW includes an accounting processor 800, an SF state processor 802, a timer 804, an accounting DB 806, and a communicator 808. This is shown by focusing on the accounting process.

The communicator 808 is an interface unit for communicating with a different NE. The communicator 808 generates a message according to a defined protocol to transmit the message to the different entity, and analyzes message received from the different NE. Further, the communicator 808 generates a message according to the defined protocol to transmit the message to the AAA server 150 of FIG. 1, and receives a message from the AAA server 150 to analyze the message. If the received message is related to accounting, the communicator 808 provides a message analysis result to the accounting processor 800. Further, the communicator 808 generates a message related to accounting and transmits the generated message to the NE.

The SF state processor 802 manages an SF state for each MS currently connected to a network. When a state of any SF transitions, the SF state processor 802 reports this to the accounting processor 800. The timer 804 manages a variety of times (or timers) required in a system operation. The accounting DB 806 manages accounting information on each MS. In addition to general accounting data, the accounting information manages state information of an accounting session and state information of an accounting sub-session. The state information of the accounting session includes a current MAC state indicator, a transition time of a current MAC state, a sleep state cumulative time, an awake state cumulative time, idle state cumulative time, and so forth. The state information of the accounting sub-session includes a current SF state indicator, a transition time of a current SF state, an admitted state cumulative time, an active state cumulative time, a provisioned state cumulative time, and so forth.

With respect to each MS, the accounting processor 800 collects the accounting information for each SF, and updates the accounting DB 806 according to the collection result. When the interim period is reached, the accounting processor 800 collects the accounting information (collected from a previous reporting time to a current time) from the BS 120 of FIG. 1, and updates the collected accounting information in the accounting DB 806. The accounting processor 800 reports the updated accounting information to the AAA server 150 of FIG. 1. When a state transition of any SF is reported from the SF state processor 802, the accounting processor 800 accesses the accounting DB 806 and updates the state information of the accounting sub-session for a corresponding MS.

In the aforementioned embodiments of the present invention, it has been described that MAC state information of an MS and state information of an SF are managed as accounting information. However, in an IEEE 802.16-based broadband wireless communication system, a QoS characteristic of the SF can be changed while a service is provided. In this case, accounting must be differentiated according to the QoS characteristic. Thus, according to another exemplary embodiment of the present invention, state information of a QoS may be managed as accounting information. For example, if a type of the QoS characteristic is classified into several classes such as gold, silver, and bronze, QoS state information as shown in Table 3 below can be managed as accounting information.

TABLE 3 current QoS class indicator
current QoS class transition time
cumulative time of QoS class 1
. . .
cumulative time of QoS class N According to exemplary embodiments of the present invention, since an SF state and a MAC state of an MS are included in accounting information, an accounting policy can be flexibly supported. That is, there is an advantage in that a differentiated accounting policy can be flexibly applied. In addition, since a cumulative time of each state is included in the state information (that is, since reporting is performed at a predetermined time after waiting for the cumulative time for each state), a signaling overhead can be reduced.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of processing accounting in a wireless communication system, the method comprising:
creating, by an Access Service Network-Gateway (ASN_GW), an accounting data base (DB) for a mobile station (MS), the ASN_GW including a timer for managing recording of times of state transitions;
when a Media Access Control (MAC) state transition of the mobile station occurs, updating, by the ASN_GW, a state information including one or more times managed by the timer in the accounting data base;
when a Service Flow (SF) state transition of the mobile station occurs, updating, by the ASN_GW, the state information including one or more times managed by the timer in the accounting data base; and
transmitting, by the ASN_GW, an accounting information including the state information to an accounting server.

2. The method of claim 1, wherein transmitting the accounting information is performed according to at least one of an interim period, a specific event, and a request of another network entity.

3. The method of claim 1, wherein transmitting of accounting information comprises:
determining whether an interim period is reached;
when the interim period is reached, reading the accounting information from the accounting data base; and
transmitting the accounting information to the accounting server.

4. The method of claim 1, wherein the state information comprises at least one of a current state indicator, a transition time of a current state, and a cumulative time of each state.

5. The method of claim 1, wherein the state information comprises at least one of a current MAC state indicator, a transition time of a current MAC state, a sleep state cumulative time, an awake state cumulative time, and an idle state cumulative time.

6. The method of claim 1, wherein the state information comprises at least one of a current SF state indicator, a transition time of a current SF state, an admitted state cumulative time, an active state cumulative time, and a provisioned state cumulative time.

7. The method of claim 1, wherein the state information comprises at least one of a QoS class indicator, a transition time of a current QoS class, and a cumulative time of each QoS class.

8. The method of claim 5, wherein creating the accounting DB comprises:
generating an accounting session for collecting an accounting information related to the MAC state of the mobile station in the accounting data base in a network entry process of the mobile station; and
transmitting an accounting session generation request message to the accounting server and receiving an accounting session generation response message from the accounting server.

9. The method of claim 8, wherein creating the accounting data base comprises:
upon generating of a service flow for the mobile station, generating an accounting sub-session for collecting an accounting information related to the service flow of the mobile station in the accounting data base; and
transmitting an accounting sub-session generation request message to the accounting server and receiving an accounting sub-session generation response message from the accounting Server.

10. An apparatus configured to process accounting in a wireless communication system, the apparatus comprising:
an accounting data base (DB) for a mobile station (MS);
a timer configured to manage recording of times of state transitions;
an accounting processor configured to update a state information including one or more times managed by the timer in the accounting data base when a Media Access Control (MAC) state transition of the mobile station occurs and to update the state information including one or more times managed by the timer in the accounting DB when a Service Flow (SF) state transition of the mobile station occurs; and a communicator configured to transmit an accounting information including the state information to an accounting server.

11. The apparatus of claim 10, wherein the communicator is further configured to transmit the accounting information according to at least one of an interim period, a specific event, and a request of another network entity.

12. The apparatus of claim 10, wherein the accounting processor is further configured to determine whether an interim period is reached and read the accounting information from the accounting data base when the interim period is reached for transmission by the communicator.

13. The apparatus of claim 10, wherein the state information comprises at least one of a current state indicator, a transition time of a current state, and a cumulative time of each state.

14. The apparatus of claim 10, wherein the state information comprises at least one of a current MAC state indicator, a transition time of a current MAC state, a sleep state cumulative time, an awake state cumulative time, and an idle state cumulative time.

15. The apparatus of claim 10, wherein the state information comprises at least one of a current SF state indicator, a transition time of a current SF state, an admitted state cumulative time, an active state cumulative time, and a provisioned state cumulative time.

16. The apparatus of claim 10, wherein the state information comprises at least one of a QoS class indicator, a transition time of a current QoS class, and a cumulative time of each QoS class.

17. The apparatus of claim 14, wherein the accounting processor is further configured to generate an accounting session for collecting an accounting information related to the MAC state of the mobile station in the accounting data base in a network entry process of the mobile station; and transmit, using the communicator, an accounting session generation request message to the accounting server and receive an accounting session generation response message from the accounting server.

18. The apparatus of claim 17, wherein the accounting processor is further configured to generate an accounting sub-session for collecting an accounting information related to the service flow of the mobile station in the accounting data base upon generation of a service flow for the mobile station; and transmit, using the communicator, an accounting sub-session generation request message to the accounting server and receiving an accounting sub-session generation response message from the accounting server.

* * * * *